(12) United States Patent
Haddad et al.

(10) Patent No.: US 6,509,054 B1
(45) Date of Patent: Jan. 21, 2003

(54) FOOD ADDITIVES HAVING ENLARGED CONCENTRATION OF PHENOLICS EXTRACTED FROM FRUITS, AND PROCESS OF OBTAINING THE SAME

(75) Inventors: William F. Haddad, Santa Clarita, CA (US); Vinod Kutty, Glendale, CA (US); Kenneth B. Shure, Santa Monica, CA (US)

(73) Assignee: American Fruits and Flavors, Pacoima, CA (US)

( * ) Notice: Subject to any disclaimer, the term of this patent is extended or adjusted under 35 U.S.C. 154(b) by 0 days.

(21) Appl. No.: 09/566,211

(22) Filed: May 5, 2000

(51) Int. Cl.[7] .............................................. A23L 1/221
(52) U.S. Cl. ........................ 426/615; 426/478; 426/590
(58) Field of Search ................................. 426/590, 478, 426/615

(56) References Cited

U.S. PATENT DOCUMENTS

| | | | | |
|---|---|---|---|---|
| 4,156,662 A | * | 5/1979 | Wilson et al. | 426/533 |
| 4,698,360 A | | 10/1987 | Masquelier | |
| 5,354,429 A | * | 10/1994 | Duncan et al. | 203/59 |
| 5,932,623 A | * | 8/1999 | Tanabe et al. | 426/428 |
| 5,989,557 A | * | 11/1999 | Bombardelli et al. | 426/478 |

OTHER PUBLICATIONS

Pearson, et al., "Apple Juice Inhibits Human Low Density Lipoprotein Oxidation", in Life Sciences 1999, vol. 64, No. 21, pp 1913–1920.

Vinox (Grape Seed Extract) Technical Publication I by Polyphenolics, Inc.

* cited by examiner

Primary Examiner—Helen Pratt
(74) Attorney, Agent, or Firm—Gabor L. Szekeres

(57) ABSTRACT

Plant phenolics are extracted from macerated fruits and vegetables, particularly from apple peels and apple cores, by agitating the macerated fruit material with an organic solvent that is acceptable in the food processing industry. After extraction and removal of the bulk of the solid fruit material the solvent is concentrated by distillation to provide a crude concentrate. Undissolved solids are separated from the crude concentrate the liquid portion of which is mixed with a carrier and spray dried to provide a solid concentrate of plant phenolics. Solids which had been removed from the crude concentrate are agitated with water to provide, after filtration, a clear aqueous concentrate of plant phenolics. The solid and liquid concentrates obtained in this manner are used as food supplements, and as additives to beverages and other food items, to provide the beverage or food item with a quantity of plant phenolics which is at least comparable to and which may exceed the plant phenolic contents of natural apple juice.

18 Claims, 2 Drawing Sheets

FOOD ADDITIVES HAVING ENLARGED CONCENTRATION OF PHENOLICS EXTRACTED FROM FRUITS, AND PROCESS OF OBTAINING THE SAME

BACKGROUND OF THE INVENTION

1. Field of the Invention

The present invention is in the field of food additives in the form of products which contain extracts of fruits having enlarged concentrations of naturally occurring phenolics. More particularly the present invention is in the field of products and additives to foods which products contain extracts of apples having enlarged concentrations of phenolics. The present invention also relates to the process of obtaining products used as food additives having enlarged concentrations of phenolics, the process involving extraction of phenolics from fruits, particularly from apples.

2. Brief Description of Background Art

It has been known in the prior art that certain compounds or ingredients, present in fruits, particularly in grapes and apples, possess various benefits for human health apart from the well known benefits of vitamins, minerals and other nutrients considered to be the main ingredients of fruits. The terms "phenolics" or "plant phenolics" have been developed and been adopted in the art for a class or type of these compounds because these compounds include in their formula a hydroxyl (OH) function attached to an aromatic carbon atom in analogy to the well known chemical phenol, or these compounds have a chemical structure closely related to or derived from a compound having an aromatic (phenolic) hydroxyl group. Usually plant phenolics have more than one aromatic (phenolic) hydroxyl group. Generally speaking, plant phenolics have antioxidant properties and have been shown in in vitro and in in vivo studies to have positive effects on the human cardio-thoracic condition. The phenolics isolated from fruits, primarily from apples, include gallic acid, flavan-3ols, flavonols, phloridzin, cinnamates, hydroxymethyl furfural and anthocyanins. A publication titled "VINOX™ (Grape Seed Extract) Technical Publication I" by Polyphenolics, Inc. Burlingame Calif., describes the health benefits obtained as a result of consumption of phenolics and related compounds found in grapes and wine (particularly red wine), and identifies by chemical structure several phenolic compounds found in grape seeds. Apples are a rich and well known source for phenolics, and the phenolics are primarily concentrated in the peel. A publication by Pearson et al. titled "Apple Juice Inhibits Human Low density Lipoprotein Oxidation", in *Life Sciences* 1999 Volume 64, No. 21 pp 1913–1920, describes human health benefits provided by the consumption of phenolics in apple juice.

Because of the richness of apples as a source of plant-phenolics and because of the availability of apple peel and core as a relatively economical raw material, efforts in accordance with the present invention to produce isolates containing high concentration of phenolics have been focused on apple peel and apple core serving as a source.

SUMMARY OF THE INVENTION

It is an object of the present invention to obtain from fruits, and particularly from apples, an extract which is rich in natural phenolics of the fruit and which is utilized as a supplement or additive in various food products.

It is another object of the present invention to obtain from fruits, and particularly from apples, an extract which is rich in natural phenolics of the fruit and which does not impart an unnatural or undesired taste component to the food product in which it is used.

It is still another object of the present invention to provide food products such as beverages, dairy products, frozen products, jams, jellies, preserves, and confectionary products which have an enlarged concentration of phenolics that have been extracted from fruits, particularly from apples, in accordance with the present invention.

The foregoing objects and advantages are attained by a product or products that is obtained first by extracting fruit with an organic solvent such as ethyl alcohol, ethyl acetate or like solvent that is compatible with use in the food processing industry. The extract of the fruit in the organic solvent is thereafter processed by removing the bulk of the solvent by distillation or evaporation to obtain in the residue of the distillation a concentrated extract which contains water and some residual organic solvent. The concentrated extract is thereafter separated into water soluble and water insoluble products in process steps, which include filtration of solid material that precipitates out from the liquid residue, and re-dissolution in water of the water soluble portion of the solid material that had been obtained by filtration of the residue. After solids have been removed by filtration, the liquid concentrate is optionally mixed with a nutritionally acceptable carrier, such as maltodextrin, rice dextrin, modified corn starch or other carrier, and the residual organic solvent is substantially completely removed by spray drying or like drying process effective to yield a solid product. The liquid concentrates, the dried solid products and solutions of the dried solid product which may be obtained by redissolving the dried solid products, contain high concentrations of phenolics. When in a liquid form the concentration of phenolics is at least approximately 1000 mg Gallic Acid Equivalents (GAE) per liter. When in a solid form, such as the spray dried product obtained from the liquid concentrate, the concentration of phenolics depends on the amount of carrier or carriers added and on the moisture content of the solid. Preferably the spray dried solid product contains at least approximately 10 mg gallic acid equivalent (GAE) per gram of solid.

The liquid concentrate, dried solid product or their solutions can be added to diverse types of food products, such as beverages, dairy products, frozen products, jams, jellies, preserves, and confectionary products to provide or enrich the products with fruit phenolics.

The features of the present invention can be best understood together with further objects and advantages by reference to the following description, taken in connection with the accompanying drawings.

BRIEF DESCRIPTION OF THE DRAWING FIGURES

DESCRIPTION OF THE PREFERRED EMBODIMENTS

Figure 1:
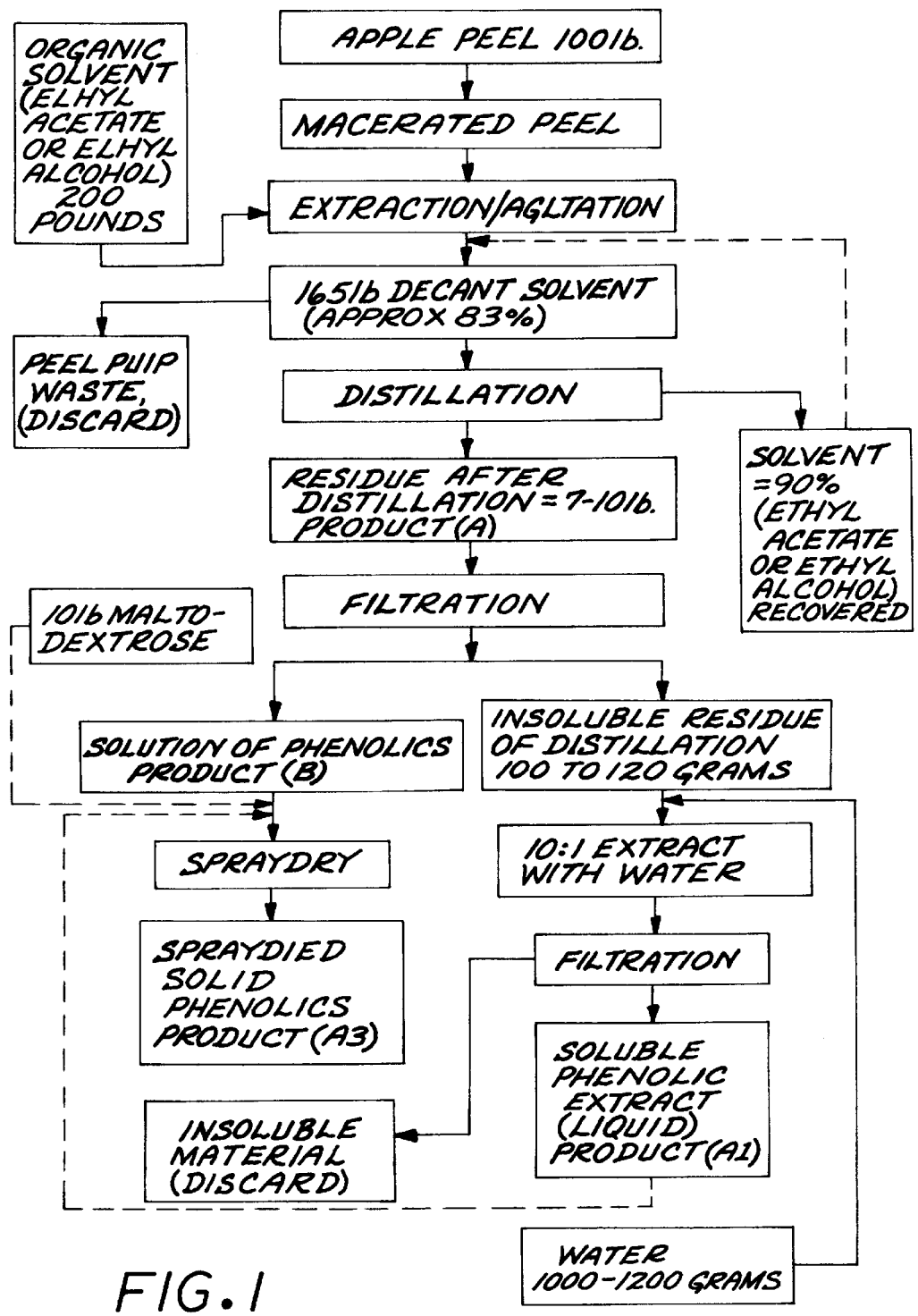
FIG. 1 is a chart of block diagrams, showing the presently preferred embodiment of the process of the invention, illustrating the products obtained in the process of the invention.
Figure 2:
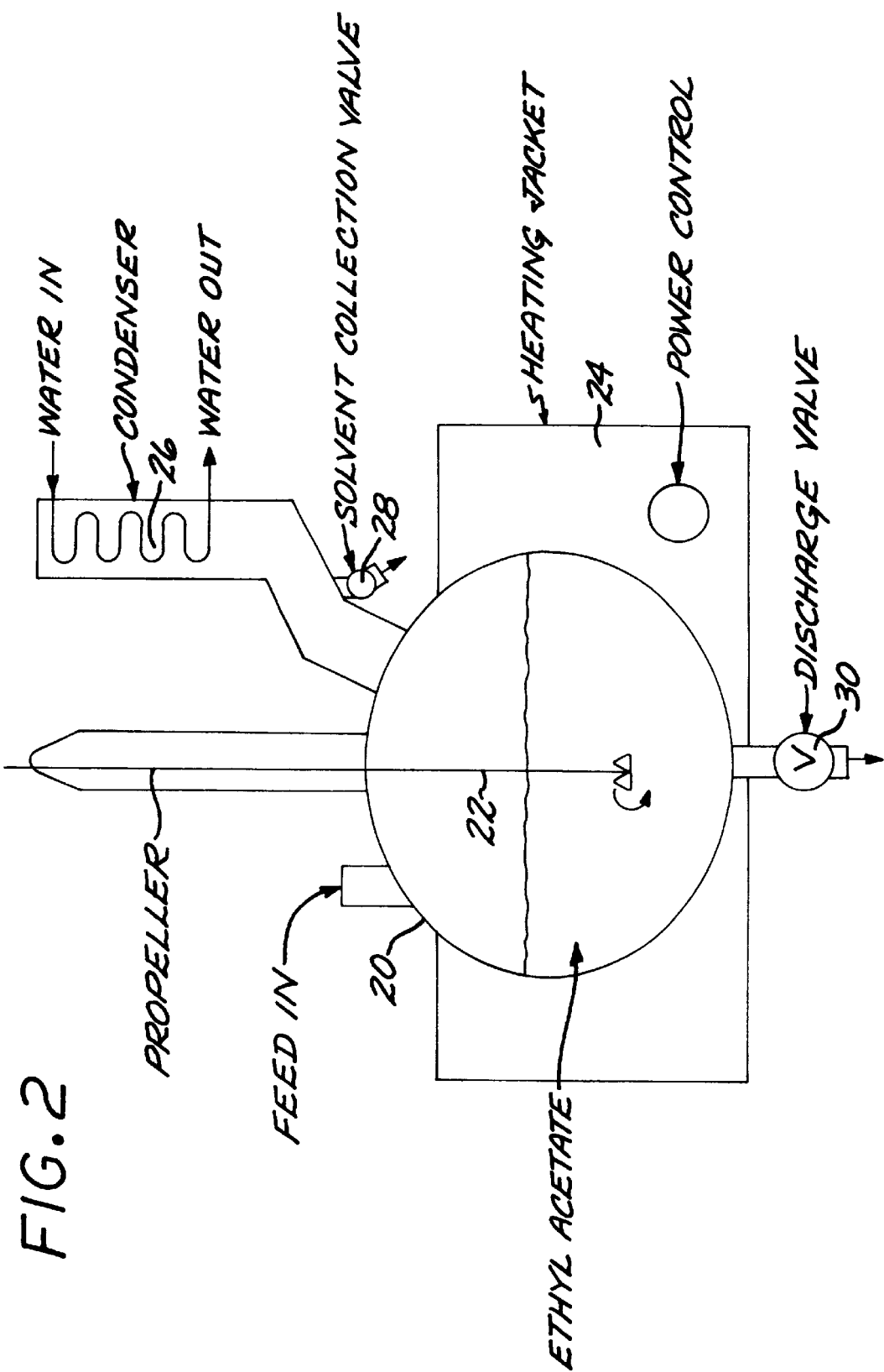
FIG. 2 is a schematic illustration of the preferred apparatus used in a step of the process of the invention, wherein organic solvent that had been used for extraction is recovered by distillation, and the extract of the fruit is concentrated.

The following specification taken in conjunction with the drawings sets forth the preferred embodiments of the present invention. The embodiments of the invention disclosed herein are the best modes contemplated by the inventors for carrying out their invention in a commercial environment, although it should be understood that various modifications can be accomplished within the parameters of the present invention.

In accordance with the present invention naturally occurring phenolics are extracted from fruits, and a liquid or solid concentrate product is obtained which is significantly enriched in phenolics and which is utilized as an additive to various and diverse food items to provide the food item with a significant quantity of phenolics originating from the fruit. The terms "phenolics", "fruit phenolics" or "plant-phenolics" are used herein substantially interchangeably and in the manner normally used in food chemistry and related art. That is, these terms refer to non-toxic substances naturally occurring in plants (primarily in fruits with special emphasis on apples) and which have an aromatic hydroxyl group and react like gallic acid in various reactions and assays, such as the art-accepted Folin-Ciocalteau reaction or assay. As is known and is illustrated below, gallic acid is 3,4,5-trihydroxybenzoic acid, and the Folin-Ciocalteau reaction or assay is commonly used in the art to quantitatively measure phenolics, the amount or concentration of which is expressed in terms of equivalents to gallic acid (Gallic Acid Equivalent per liter; GAE/l). The phenolic compounds included in fruits, and extracted therefrom in accordance with the present invention include flavan-3ols, flavonols, phloridzin, cinnamates, hydroxymethyl furfural and anthocyanins.

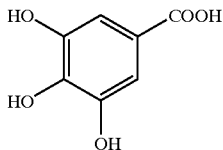

gallic acid, 3,4,5-trihydroxybenzoic acid

The process of the present invention may be practiced on any fruit that contains a substantial quantity of plant-phenolics so that the extraction process is worthwhile and economical. However, the primary source of plant-phenolics in accordance with the present invention comprises apples, the preferred embodiment of the process is practiced on apples and the preferred product contains plant-phenolics extracted from apples. Therefore, the process and products are hereinafter described with reference to the preferred embodiments which utilize apples as a source. Nevertheless, it should be understood that the invention per se is not limited to apples, rather it can be applied to any fruit, and any vegetable that contains a substantial quantity of plant-phenolics, comparable within 1 or 2 orders of magnitude to the quantity of phenolics contained in apples.

The phenolic ingredients are extracted from apples (or other fruit) in accordance with the invention by using an organic solvent which is compatible with food production (food grade solvent). Ethyl acetate and ethyl alcohol are the preferred solvents. As is known, ethyl acetate has only limited solubility in water (not completely miscible with water) whereas ethyl alcohol is completely miscible with water. Moreover, as is known, sugars and related compounds which are of no particular value in the phenolic extracts of the present invention tend to have greater solubility in ethanol or in ethanol-water mixtures than in ethyl acetate. For this reason, the preferred solvent used in the extraction process in accordance with the present invention is ethyl acetate.

The fruit to be extracted, such as apple peel and apple cores are preferably macerated, ground or cut into small pieces prior to extraction so as to increase their surface area and render the extraction process more efficient. Apple peels and apple cores serve as particularly advantageous raw materials in accordance with the present invention, because the peels are known to be particularly rich in plant-phenolics, and because apple peels and cores are available at economical price.

The solvent, preferably ethyl acetate is preferably used in a 2 to 1 ratio weight by weight (w/w) of solvent to the macerated apple peel and cores, however, a larger or smaller solvent to fruit ratio would still provide satisfactory results and is within the scope of the invention. Preferably the process of extraction is conducted at below ambient temperature in order to minimize loss of solvent by evaporation. The extraction process is conducted in equipment normally used in the food industry, for example in a tank provided with efficient stirring or agitating mechanism. The length of time of the extraction step is not considered critical, however the extraction is preferably conducted for sufficient length of time during which substantially all extractable phenolics of the fruit are passed from the fruit into solution in the organic solvent. Generally speaking a number of hours are required for this purpose; in the preferred embodiment of the process apple peels and cores are extracted for approximately 4 hours.

After the extraction process has been completed and stirring or agitation has been discontinued a separate layer of the solvent is formed when ethyl acetate (or other non-water miscible) solvent is used. The solvent layer is separated from the aqueous layer which tends to contain the bulk of the solid material, namely the macerated fruit particles from which the phenolics had been extracted. At this stage of the process the aqueous layer, and the macerated fruit particles are discarded. In the event ethyl alcohol is used as the solvent, then there is no separation of aqueous and organic layers after agitation or stirring is discontinued. In this case, the bulk of the macerated fruit particles are removed from the solution by straining, filtration or centrifugation, utilizing equipment well known and commonly used in the art for such operations. By these techniques an aqueous ethanol solution is obtained which is substantially free of suspended coarse solid particles. However, when the organic solvent is ethyl acetate (or other non water miscible solvent) the organic solution obtained by separating the aqueous and organic layers tends to contain some suspended solid material, which does not necessarily need to be removed by filtration before the next step.

The next step in the process of the present invention is recovery of the bulk of the solvent used in the extraction process, and concentration of the extract. This is accomplished in a distillation apparatus that is schematically illustrated in FIG. 1. The apparatus, which is constructed in accordance with known techniques and principles in the food and related chemical industry, includes a vessel 20, equipped with stirrer 22, heater 24, and a water cooled condenser 26 having a discharge valve 28 for condensed liquid. The solution of phenolics obtained in the extraction step is charged into the vessel 20, and the vessel 20 is heated to bring the solvent to boil. Substantially pure solvent is collected through the discharge or solvent collection valve 28. The recovered solvent can be used again for extraction of macerated fruit material. Generally speaking, concentration of the extract is performed by distilling off solvent until the weight of the extract is approximately 5 to 15 percent of its original weight. Generally speaking, approximately 75 to 95% of the solvent which had been charged into the vessel 20 is recovered in this manner and is preferably kept refrigerated for another step of extraction. The distillation and concentration process requires several hours.

The material remaining after distilling off of the bulk of the solvent comprises water (originating primarily from the fruit) some residual solvent, suspended solid material, and dissolved solid material, comprising the bulk of the desired phenolics. For the purposes of the present description this crude concentrate is termed product A. Starting with approximately 100 lb of macerated fruit particles, a typical range of weight of product A is between 5 to 15 lb, that is approximately 5 to 15 per cent by weight of the weight of the fruit particles. Product A is removed from the vessel 20 of concentration/distillation through discharge valve 30.

Undissolved solids are preferably removed from this concentrate (product A) by filtration (the first filtration), centrifugation or other procedure well known in the art. The solids removed in this manner comprise a relatively small percentage of the total weight of the concentrate (approximately 1 to 3% by weight) and include materials and substances that are substantially insoluble in water (water insolubles), and are of no further interest in the process of the invention. The solids removed by the first filtration (or like procedure) from the liquid concentrate also include phenolic and related substances that can be re-dissolved in water. For this reason, the solids obtained by the first filtration of the concentrate are treated (agitated) with water in an amount which is approximately 5 to 15 times the weight of the solids, yielding a solution still having the water insoluble solids undissolved and suspended in the solution. The water insolubles are removed from the latter solution by filtration (the second filtration) or like method (such as centrifugation) to provide a substantially clear and concentrated solution of phenolics (clear solution, also termed solution A1). The water insoluble solids that have been removed by filtration (or like operation) from solution A1 are not considered useful in accordance with the invention, and are discarded. The clear solution (product A1) obtained in this manner comprises only a relatively minor portion of the plant-phenolic concentrate of the present invention. Nevertheless, this product is highly useful, as it is clear (not opaque or cloudy) and for this reason it can be used as an additive in beverages which for aesthetic or other reasons should be clear and not opaque or cloudy. Alternatively, and optionally the clear solution (A1) is combined in accordance with the present invention with the major portion of the liquid concentrate (solution B) that is obtained after distillation and the first filtration (or like process) of solid removal from the concentrate. The clear solution A1 contains several times greater concentration of plant phenolics than a natural juice that would be obtained by state-of-the-art juice making procedures from the fruit. Thus in the preferred embodiment solution A1 contains at least approximately 10 times greater concentration of plant phenolics, as determined by the art-accepted Folin-Ciocalteau assay for gallic acid equivalents (GAE), than natural apple juice. Since natural apple juice usually has a concentration of approximately 100 mg GAE per liter (as determined by the Folin-Ciocalteau assay) product A1 has a concentration of at least approximately 1000 mg GAE /liter, preferably it has a approximately 10,000 or more mg GAE/liter.

The majority of the extracted phenolics is contained in the liquid concentrate that has been obtained after distillation and the first filtration. This liquid product (solution B) contains at least approximately 1000 mg Gallic Acid Equivalent per liter, and typically contains plant-phenolics in concentrations of approximately 10,000 or more mg GAE/liter. Because only a small weight percentage of the concentrate (product A) has been removed in the form of undissolved solids in the first filtration, product B still weighs approximately 5 to 15 per cent by weight of the weight of the fruit particles.

Liquid product B typically has some opacity, although does not include any readily filterable solid material. In accordance with a preferred embodiment of the process of the present invention, liquid product A1 is added to liquid product B, thus combining the two fractions of water soluble plant-phenolics. Further, in accordance with a preferred embodiments of the present invention liquid product B itself, or in combination with liquid product A1, is spray dried to provide a solid concentrated phenolics material. The spray drying process is best performed after a suitable carrier is added to the liquids, because without a carrier the concentrate of phenolics tends to be tacky, sticky and difficult to handle. Thus, the purpose of the carrier is to render the spray dried concentrate of phenolics less sticky, more manageable and to add bulk to the material. Suitable carriers for this purpose are maltodextrin, rice dextrin, modified corn starch, modified starch from other sources and edible gums. The presently preferred carrier is maltodextrin. Preferably the carrier is added to the liquid concentrate (combined liquid products A1 and B) in an amount which equals in weight with the weight of the liquid product, although a wide range of weight of the carrier relative to the weights of the liquid concentrate can be used. The liquids A1 and B containing the added carrier are then spray dried to provide a solid concentrate of plant phenolics. This latter, solid product is termed product A3. During the process of spray drying any remaining organic solvent (such as the ethyl acetate) is substantially removed from the product.

It will be recognized by those skilled in the art that instead of spray drying other like processes known in the food processing and related arts can also be used to obtain the solid plant-phenolics with added carrier from the liquids A1 and B. It will also be recognized by those skilled in the art that the concentration of plant phenolics in the spray-dried product A3 depends not only on the concentration of plant phenolics in the liquids, but also on the amount of carrier which is added to the liquids prior to spray drying, and also on the residual moisture content of the solid product A3. Nevertheless, what is attained within the scope of the present invention is a solid product, a relatively small amount of which can be added to a food product (for example to a beverage) to enrich the food product with at least as much plant phenolics as would be available in a single serving of natural apple juice. As noted above, natural apple juice usually has a concentration of approximately 100 mg GAE per liter. The solid product A3 obtained in accordance with the present invention usually has such a concentration of plant phenolics that approximately 1 gram of product A3 when added to approximately 100 grams of a beverage (or other food) will provide at least the same concentration of plant phenolics as would be available in natural apple juice. This means that the solid material usually contains 10 mg of plant phenolics per gram, that is approximately 1 per cent by weight of plant phenolics or more are present in the solid material. Because, as noted above, the concentration of plant phenolics in the spray dried solid product A3 depends on several factors such as the amount of added carrier and retained moisture, solid extracts of fruits in the nature of product A3 having a concentration of approximately 0.2 weight percent or greater of plant phenolics (as measured by the Folin-Ciocalteau assay) is contemplated to be within the scope of the invention.

When the spray-dried concentrate A3 or the liquid concentrate B or A1 are added to a food product that is not a liquid, such that the resulting concentration of plant phenolics cannot be readily expressed in terms of gallic acid equivalent per liter, then sufficient quantity of the concentrate A3 (or of the concentrate A1) is added so as to provide a customary single serving of the food product with plant phenolics equivalent to approximately 5 to 20 mg of gallic acid. In other words sufficient quantity of the concentrate A3 (or of the concentrate A1) is added to the food product to provide a customary single serving of the food product with as much plant phenolics as is available in a single customary serving of natural apple juice.

The clear liquid product A1 is eminently suitable as an additive to beverages where clarity (lack of opacity) is desired for aesthetic or other reasons. Typically, approximately 3 grams of this liquid product are added to 100 mls of a beverage to provide a beverage having about the same concentration of plant-phenolics as natural apple juice. Those skilled in the art will readily recognize that the exact amount to be added depends on the actual concentration of plant phenolics in A1, which can be readily determined by the standard Folin-Ciocalteau assay.

The liquid product A1, and the solid product A3 are used as additives or supplements in several and various types of foods and beverages, such as juices, baked goods, frozen foods, dairy products, jams, jellies, preserves, confectionary items and others. In most of these applications the slight opacity of beverages which may occur as result of adding solid product A3 does not represent a problem. A particularly preferred use of these products is a cola beverage, containing cola flavor, high fructose corn syrup, caramel color, phosphoric acid, water, carbon dioxide and a quantity of product A3 which is sufficient to provide a concentration of approximately 100 mg GAE/liter to the beverage, such as natural apple juice. Usually, approximately 1 gram of product A3 per 100 g of the beverage provides this concentration. Those skilled in the art will readily understand that a greater amount of product A3 or of the liquid product A1 can be added to any food product to provide a larger concentration or unit dose of plant phenolics than what would be available in natural apple juice.

The products of the present invention, liquid A1 and particularly the solid product A3 can also be packaged, distributed and used as a dietary of food supplement to provide plant phenolics to human users to be taken orally, and not as a component of a beverage or other food product. Thus, the solid and/or liquid extracts A1 and A3 products may be combined with pharmaceutically and nutritionally acceptable excipients to provide liquid droplets, or gels, capsules, tablets or any other usual form of orally ingestible delivery vehicle, preferably in such quantity that a unit dose, such as a single tablet, capsule, gel capsule or the like of the formulation contains at least approximately as much plant phenolics as a single serving of natural apple juice would. This means that a single dose or unit of the formulation would contain approximately 5 to 20 mg or more of plant phenolics. Thus, in the exemplary but actual situation of the solid product A3 having a concentration of 10 mg GAE per gram of solid product, the unit dose of the formulation contains approximately 0.5 to 2 or more grams of the solid product A3, and a pharmaceutically acceptable excipient.

SPECIFIC EXAMPLE

Extraction

The block diagram of FIG. 1 illustrates the process of the herein described specific example. Apple peel and cores were acquired immediately after the peeling process. The apple peels and cores were macerated in order to increase surface area for better extraction, using a commercial Reitz-angle disintegrator. 100 lb. of chilled macerated peels and cores were then placed in a stainless steel tank, extracted with 200 lb. chilled ethyl acetate FCC (99%+purity) in a 1:2 ratio (wt/wt) with propeller agitation for four hours. The extraction was carried out at 40° C. to prevent solvent loss due to evaporation. The mixer was then turned off and the peel was allowed to settle for 30 minutes. The solvent (ethyl acetate) layer on top was removed from the tank. Approximately 80–83% of the solvent was recovered.

Distillation

All of the ethyl acetate solvent removed after extraction was charged into a 100-liter distillation unit designed for solvent recovery. The weigh of the material charged was approximately 165 lb. The mixture was heated using an external electrical element to 78° C. and allowed to boil and distill until volume in unit was reduced to 7–12% of original weight. This process took 8–12 hours. There was no reflux during the distillation and the temperature of the distillate during collection was 78° C. Approximately, 88–92%, by weight, of the solvent charged into the distillation unit was collected as distillate and kept chilled in separate containers for re-use in subsequent extractions. The material left in the unit that was the crude concentrate (material A) was collected from the vessel through a discharge valve.

Phenolic Recovery

The crude concentrate (material A) remaining in the distillation unit contained plant phenolics, water, and ethyl acetate. Material A weighed between 7 and 10 lb. The percentage of dissolved plus undisolved suspended solids in this product was determined using an Ohaus MB200 Moisture Analyzer and was found to be between 7 and 12%. Material A was then subjected to a filtration step on Whatman #4 filter paper (by gravity) to remove the undissolved solid material from the liquid concentrate which after removal of the insolubles is termed product B. After air drying the weight of the solids removed from crude concentrate (material A) was approximately 100–120 grams. This solid contained phenolics (and other materials) insoluble in water and also phenolics which were dissolved when the solids were treated with water (1000 to 1200 grams, approximately 10 times the weight of the solids) at 40° C. with agitation for approximately two hours. Insoluble solids were removed by passing the aqueous solution through a Whatman #4 filter under the force of gravity. The filtrate is a clear yellow liquid (product A1). The insoluble material removed by the filter paper was discarded.

The clear filtrate (product A1) contains water-soluble and dispersible phenolics. As measured by the Folin-Ciocalteau assay product A1 contained approximately 2800 mg GAE/Kilo, that is it contained approximately 28 times greater concentration of plant phenolics than natural apple juice. Approximately 1000 to 13000 grams of this product was obtained. Product A1 was mixed with product B thoroughly. The resulting dark liquid product weighed approximately 10 lb. and was blended with 10 lb. of Arancia Amidex® DE10 food grade Maltodextrin, in a 1:1 ratio and spray dried using a commercial spray drier with the following settings:

Inlet temperature=200° C.

Outlet temperature=90 ° C.

The solid product obtained in the spray drying process is termed product A3. As measured by the Folin-Ciocalteau assay product A3 contained approximately 9700 mg GAE/Kilo, that is it contained approximately 97 times greater concentration of plant phenolics than natural apple juice.

Specific Applications

The A1 liquid product is advantegously used in a beverage or any liquid product requiring a clear (not opaque) finished apperance. Product A1 when added to beverages which are per se substantially devoid of plant phenolics in a ratio of 3% of the product A1 in the final beverage product, result in a phenolic concentration equivalent to natural apple juice (approximately 100 mg GAE/l)

Cola flavored drink: The solid product A3—spray dried form of plant-phenolic may be used in any food or nutritional supplement. For example, approximately 3%, by weight of product A3, cola flavor, high fructose corn syrup, caramel color, phosphoric acid, water and carbon dioxide provide a finished carbonated cola beverage containing plant-phenolics in concentration equivalent to natural apple juice.

Apple juice, fortified in phenolics: Approximately one percent (1%) by weight of the solid product A3, apple juice concentrate and water provide reconstituted apple juice containing twice the phenolic content of natural apple juice.

Measurement of Plant-Phenolic Content

The Folin-Ciocalteau method is used to measure the phenolic content of the products using gallic acid as a standard. Total phenolic content was determined colorimetrically, using a Bausch & Lomb Spectronic 20 spectrophotometer. Preparation of reagents, standard solution and curve. The molecular weight of gallic acid is 170.1. A standard solution of gallic acid at 0.01 M is made by completely dissolving with stirring 1.701 grams of gallic acid in 1 liter distilled water. Diluted solutions of gallic acid in millimolar concentrations ranging from 0.00 mM to 0.2 mM are created as standards from distilled water and this standard solution. A sodium bicarbonate solution of 0.71 M strength is made by dissolving 59.64 grams of the substance in 1 liter of distilled water.

Folin-Ciocalteau Assay 0.1 gram phenolic substance (plant extract) to be assayed is weighed out and diluted to 10 grams with water and further diluted with another 6 grams of 0.71 M sodium bicarbonate. This mixture is allowed to react with 0.1 gram Folin-Ciocalteau reagent for 2 hours. A colored complex develops during this reaction period. The colored reaction medium is then measured for absorbance at 660 nm using the spectrophotometer. By comparison with an absorbance versus gallic acid equivalent per liter (GAE/l) curve that has been obtained by measurement of the standard solutions (standard curve) the concentration of plant phenolics in the assayed product is obtained (expressed as mg Gallic Acid Equivalents (GAE)/Liter). The phenolic standard gallic acid, sodium bicarbonate, and folin-ciocalteau reagent were obtained from Sigma Chemical Company, St Louis Mo.

What is claimed is:

1. A process for extracting plant phenolics from a fruit or vegetable, the process comprising the steps of:
    macerating the fruit or vegetable into particles;
    extracting the fruit or vegetable particles with an organic solvent acceptable in the food processing industry by agitating the particles with the organic solvent;
    after extraction separating the bulk of the particles from the organic solvent comprising extracted plant phenolics;
    concentrating the organic solvent comprising the extracted phenolics by distillation to approximately one tenth or less of its original volume to obtain a crude concentrate of plant phenolics; and
    removing solid material from the crude concentrate to obtain a stock concentrate of plant phenolics.

2. The process in accordance with claim 1 further comprising the step of reducing the stock concentrate to dryness to provide a solid concentrate of plant phenolics.

3. The process in accordance with claim 2 further comprising the step of agitating the solid material removed from the crude concentrate with water to provide an aqueous solution having insoluble suspended particles, and removing the water insoluble suspended particles from the resulting aqueous solution to provide a clear aqueous concentrate of plant phenolics.

4. The process in accordance with claim 2 further comprising the step of adding a carrier selected from the group consisting of maltodextrin, rice dextrin, modified starch and edible gums to the stock concentrate before reducing the concentrate to dryness.

5. The process in accordance with claim 1 further comprising the step of agitating the solid material removed from the crude concentrate with water to provide an aqueous solution having insoluble suspended particles, and removing the water insoluble suspended particles from the resulting aqueous solution to provide a clear aqueous concentrate of plant phenolics.

6. The process in accordance with claim 5 further comprising the step of combining the clear aqueous concentrate of plant phenolics with the stock concentrate and thereafter reducing the combined concentrates to dryness to provide a solid concentrate of plant phenolics.

7. The process in accordance with claim 6 further comprising the step of adding a carrier selected from the group consisting of maltodextrin, rice dextrin, modified starch and edible gums to the combined concentrates before reducing the combined concentrates to dryness.

8. A process for extracting plant phenolics from apple peels and cores, the process comprising the steps of.
    macerating apple peels and apple cores
    extracting the macerated apple peels and apple cores with an organic solvent acceptable in the food processing industry by agitating the fruit or vegetable with the organic solvent;
    after extraction separating the bulk of the macerated apple peels and apple cores from the organic solvent comprising extracted plant phenolics;
    concentrating the organic solvent comprising the extracted phenolics by distillation to approximately one tenth or less of its original to obtain a crude concentrate of plant phenolics; and
    removing solid material from the crude concentrate to obtain a stock concentrate of plant phenolics.

9. The process in accordance with claim 8 further comprising the step of reducing the stock concentrate to dryness to provide a solid concentrate of plant phenolics.

10. The process in accordance with claim 9 further comprising the step of agitating the solid material removed from the crude concentrate with water to provide an aqueous solution having insoluble suspended particles, and removing the water insoluble suspended particles from the resulting aqueous solution to provide a clear aqueous concentrate of plant phenolics.

11. The process in accordance with claim 9 further comprising the step of adding a carrier selected from the group consisting of maltodextrin, rice dextrin, modified starch and edible gums to the stock concentrate before reducing the concentrate to dryness.

12. The process in accordance with claim 8 further comprising the step of agitating the solid material removed from the crude concentrate with water to provide an aqueous solution having insoluble suspended particles, and removing the water insoluble suspended particles from the resulting aqueous solution to provide a clear aqueous concentrate of plant phenolics.

13. The process in accordance with claim 12 further comprising the step of combining the clear aqueous concentrate of plant phenolics with the stock concentrate and thereafter reducing the combined concentrates to dryness to provide a solid concentrate of plant phenolics.

14. The process in accordance with claim 13 further comprising the step of adding a carrier selected from the group consisting of maltodextrin, rice dextrin, modified starch and edible gums to the combined concentrates before reducing the combined concentrates to dryness.

15. The process in accordance with claim 14 wherein the organic solvent is ethyl acetate.

16. The process in accordance with claim 13 wherein the organic solvent is ethyl acetate.

17. The process in accordance with claim 8 wherein the organic solvent is ethyl acetate.

18. The process in accordance with claim 8 wherein in the step of macerating, apple peels and apple cores are macerated and wherein in the step of extracting, the macerated apple peels and cores are extracted.

* * * * *

UNITED STATES PATENT AND TRADEMARK OFFICE
CERTIFICATE OF CORRECTION

PATENT NO. : 6,509,054 B1  Page 1 of 1
DATED : January 21, 2003
INVENTOR(S) : Haddad et al.

It is certified that error appears in the above-identified patent and that said Letters Patent is hereby corrected as shown below:

<u>Column 10,</u>
Line 40, "of." should be -- of: --.

Signed and Sealed this

First Day of July, 2003

JAMES E. ROGAN
*Director of the United States Patent and Trademark Office*